United States Patent
Morishima et al.

(10) Patent No.: US 10,775,569 B2
(45) Date of Patent: Sep. 15, 2020

(54) OPTICAL CONNECTOR AND OPTICAL CONNECTION STRUCTURE

(71) Applicant: SUMITOMO ELECTRIC INDUSTRIES, LTD., Osaka-shi, Osaka (JP)

(72) Inventors: Tetsu Morishima, Yokohama (JP); Osamu Shimakawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/697,480

(22) Filed: Sep. 7, 2017

(65) Prior Publication Data
US 2018/0074268 A1  Mar. 15, 2018

(30) Foreign Application Priority Data
Sep. 9, 2016 (JP) ................. 2016-176660

(51) Int. Cl.
*G02B 6/255* (2006.01)
*G02B 6/40* (2006.01)
(Continued)

(52) U.S. Cl.
CPC ....... *G02B 6/3885* (2013.01); *G02B 6/02376* (2013.01); *G02B 6/262* (2013.01);
(Continued)

(58) Field of Classification Search
CPC .. G02B 6/3885; G02B 6/381; G02B 6/02376; G02B 6/262; G02B 6/3803; G02B 6/403;
(Continued)

(56) References Cited

U.S. PATENT DOCUMENTS

2012/0099112 A1*  4/2012  Alphonse .......... G01B 9/02044
                                                         356/479
2013/0044978 A1   2/2013  DeDobbelaere et al.
(Continued)

FOREIGN PATENT DOCUMENTS

CN  104536100 A  4/2015
CN  204405899 U  6/2015
(Continued)

OTHER PUBLICATIONS

Kengo Watanabe et al., "Development of MPO type 8-multicore fiber connector," Optical Fiber Communications Conference and Exhibition (OFC), 2015, 3 pages, paper W4B.3., 2015.

*Primary Examiner* — Kaveh C Kianni
*Assistant Examiner* — Hung Q Lam
(74) *Attorney, Agent, or Firm* — Faegre Drinker Biddle & Reath LLP (57) ABSTRACT

An optical connector comprises a first optical waveguide including a plurality of cores each extending along a first direction, the first optical waveguide having a first end face, wherein the cores are arranged on the first end face at positions except a position of a central axis of the first optical waveguide, and a first lens having a second end face and a third end face in the first direction, the first lens having an optical axis extending along the first direction. The first optical waveguide and the first lens are arranged so that the central axis of the first optical waveguide coincides with the optical axis of the first lens. The second end face is positioned facing the first end face, and the third end face extends along a plane perpendicular to an optical axis of the first optical waveguide.

16 Claims, 8 Drawing Sheets

(51) Int. Cl.
  *G02B 6/38*  (2006.01)
  *G02B 6/02*  (2006.01)
  *G02B 6/26*  (2006.01)
  *G02B 6/32*  (2006.01)

(52) U.S. Cl.
  CPC ........... *G02B 6/381* (2013.01); *G02B 6/3803* (2013.01); *G02B 6/02042* (2013.01); *G02B 6/264* (2013.01); *G02B 6/32* (2013.01); *G02B 6/3806* (2013.01); *G02B 6/403* (2013.01)

(58) Field of Classification Search
  CPC ........ G02B 6/32; G02B 6/264; G02B 6/3806; G02B 6/02042
  USPC .... 385/54–56, 59–67, 71–74, 83, 92–93, 98
  See application file for complete search history.

(56) References Cited

U.S. PATENT DOCUMENTS

| | | | |
|---|---|---|---|
| 2013/0302032 A1 | 11/2013 | Shimakawa | |
| 2016/0118762 A1* | 4/2016 | Tadakuma | H01S 3/06737 359/341.33 |
| 2016/0139339 A1* | 5/2016 | Sasaki | G02B 6/3825 385/59 |
| 2018/0172917 A1* | 6/2018 | Ootorii | G02B 6/32 |

FOREIGN PATENT DOCUMENTS

| | | |
|---|---|---|
| JP | 2013-225010 A | 10/2013 |
| JP | 2016-061941 A | 4/2016 |

\* cited by examiner

OPTICAL CONNECTOR AND OPTICAL CONNECTION STRUCTURE

CROSS REFERENCE TO RELATED APPLICATIONS

This application is based upon and claims the benefit of priority from Japanese Patent Application No. 2016-176660, filed on Sep. 9, 2016, the entire contents of which are incorporated herein by reference.

TECHNICAL FIELD

The present invention relates to an optical connector and an optical connection structure.

BACKGROUND

"K. Watanabe, et al., "Development of MPO type 8-multicore fiber connector," Optical Fiber Communications Conference and Exhibition (OFC) 2015, paper W4B. 3." discloses a condition for polishing a connecting end face of an optical fiber for physically contacting multi-core fibers each having a plurality of cores, each other, and some experiment results of it. The connecting end faces of the multi-core fibers are polished to such a level that the difference between the maximum and the minimum amounts by which the cores protrude from the ferrule becomes equal to or less than 0.26 micrometer, and the connecting face of the multi-core fiber is then brought into contact with that of another by applying a compressive force. The experiment results indicate that, with such a polishing condition, the compressive force required for each one of the cores to be connected using physical-contact (PC) connection can be reduced to 14 N.

SUMMARY

In accordance with one aspect of the invention, an optical connector comprises a first optical waveguide including a plurality of cores each extending along a first direction, the first optical waveguide having a first end face in the first direction, wherein the cores are arranged on the first end face at positions except a position of a central axis of the first optical waveguide, and a first lens having a second end face and a third end face opposite to the second end face in the first direction, the first lens having an optical axis extending along the first direction. The first optical waveguide and the first lens are arranged so that the central axis of the first optical waveguide coincides with the optical axis of the first lens. The second end face is positioned facing the first end face, and the third end face extends along a plane perpendicular to an optical axis of the first optical waveguide.

In accordance with another aspect of the invention, an optical connection structure comprises first and second optical connectors. Each of the first and second connectors comprises a first optical waveguide including a plurality of cores each extending along a first direction, the first optical waveguide having a first end face in the first direction, wherein the cores are arranged on the first end face at positions except a position of a central axis of the first optical waveguide, and a first lens having a second end face and a third end face opposite to the second end face in the first direction, the first lens unit having an optical axis extending along the first direction. The first optical waveguide and the first lens are arranged so that the central axis of the first optical waveguide coincides with the optical axis of the first lens. The second end face is positioned facing the first end face, and the third end face extends along a plane perpendicular to an optical axis of the first optical waveguide. The third end face of the first optical connector faces the third end face of the second optical connector in parallel, with a gap therebetween in the first direction.

DETAILED DESCRIPTION

To put a multi-core fiber into practical use, it may be necessary for the cores of the multi-core fiber to be connected to those provided to another, or for the cores of the multi-core fiber to be connected to a fiber bundle that is a bundle of single-core fibers, each of which corresponds to corresponding one of the cores provided to the multi-core fiber. The connection between the multi-core fibers, or between the multi-core fiber and the fiber bundle (hereinafter, a multi-core fiber and a fiber bundle are both referred to as an "optical waveguide") is implemented using physical-contact (PC) connection. The PC connection can connect the cores of an optical waveguide to those of another optical waveguide respectively by bringing the end face of the optical waveguide into contact with that of the other. The PC connection, however, requires each core of the optical waveguides to be brought into contact with corresponding one of the cores without any gap therebetween, by bringing the end face of the optical waveguide into surface contact with the end face of the other optical waveguide while causing both of the end faces to be elastically deformed by the compressive force. When the number of the cores provided to the optical waveguide becomes increased, the force applied to each core becomes more distributed. Thus, as the number of cores of the optical waveguide increases, the compressive force should increase as well.

In addition, in the multi-core fiber disclosed in K. Watanabe, et al., the polishing condition needs to be strictly managed, so that the difference between the maximum and the minimum amount by which the cores protrude is controlled to an extremely small level. It is, however, practically difficult to strictly manage the condition for polishing the end face of the optical waveguide.

To address these issues, it might be possible to connect the end faces of the optical waveguide and the counterpart optical waveguide with a gap therebetween. Such a structure, however, might produce back reflection at the interface between the optical waveguide and the air. Thus, an object of the present application is to provide an optical connector and an optical connection structure capable of connecting an optical waveguide having a plurality of cores to another with a gap therebetween, while suppressing back reflection.

Description of Embodiment of the Present Application

To begin with, features according to some embodiments of the present application will be explained, by listing up the features. An optical connector according to an embodiment of the present application comprises a first optical waveguide including a plurality of cores each extending along a first direction, the first optical waveguide having a first end face in the first direction, wherein the cores are arranged on the first end face at positions except a position of a central axis of the first optical waveguide, and a first lens having a second end face and a third end face opposite to the second end face in the first direction, the first lens having an optical axis extending along the first direction. The first optical waveguide and the first lens are arranged so that the central axis of the first optical waveguide coincides with the optical axis of the first lens. The second end face is positioned facing the first end face, and the third end face extends along a plane perpendicular to an optical axis of the first optical waveguide.

The optical connector describe above outputs the light beam output from the first optical waveguide from the third end face of the first lens, after bending the light beam toward the optical axis of the first lens inside of the first lens. At this time, the light beam output from the third end face is inclined with respect to the optical axis of the optical waveguide, but, because the third end face extends along a plane perpendicular to the optical axis of the optical waveguide, the light beam output from the third end face does not intersect perpendicularly with the third end face. Thus, the optical connector can suppress back reflection at the interface between the first lens and the air. Furthermore, the optical connector does not require the compressive force for bringing the cores into the PC connection, because a plurality of cores on the first end face of the first optical waveguide are not connected to those on the other using the PC connections, Thus, the optical connector can optically connect the cores of the optical waveguide to those of other easily, and alleviate the condition for polishing the first end face.

The optical connector may comprise a second optical waveguide including a plurality of cores each extending along the first direction, the second optical waveguide having a first end face in the first direction, wherein the cores are arranged on the first end face at positions except a position of a central axis of the second optical waveguide, and a second lens having a second end face and a third end face opposite to the second end face in the first direction, the second lens having an optical axis extending along the first direction. The second optical waveguide and the second lens may be arranged so that the central axis of the second optical waveguide coincides with the optical axis of the second lens. The second end face of the second lens may be positioned facing the first end face of the second optical waveguide, and the third end face of the second lens may extend along a plane perpendicular to an optical axis of the second optical waveguide. Since the optical connector having the second optical waveguide including the cores does not require the compressive force for bringing the first end face into the PC connection with another, the optical connector described above can be optically connected easily.

The first and second lenses of the optical connector may be integrated into a lens array. This optical connector with the lens array can be assembled easily. Thus, the optical connector described above can be manufactured easily.

The first and/or second lens of the optical connector may be a Grin lens. When the first and/or second lens is a Grin lens, the optical connector described above can be preferably structured.

The arrangement of the cores on the first end face of the optical connector may have an even-numbered rotational symmetry with respect to the central axis of the optical waveguide. For example, when the optical connector described above is connected to another optical connector having the same structure as a counterpart of the connection, the light beam output from each of the cores of the optical waveguide is bent toward the optical axis of the lens inside of the lens, is bent again toward the opposite direction inside of the counterpart lens, and reaches the counterpart optical waveguide. In other words, the light beam output from each of the cores in one of the optical connectors becomes incident on the end face (the first end face) of the counterpart optical waveguide at a position symmetric to the core, with respect to the central axis of the optical waveguide. Thus, the same core arrangement can be used on the optical connector and the counterpart optical connector when the arrangement of the cores on the first end face has an even-numbered rotational symmetry with respect to the central axis of the optical waveguide. Hence, types of optical connectors can be reduced.

Each of the cores provided to the optical waveguide may be arranged at a position except the position of the central axis of the optical waveguide on the first end face. If a core is provided on the first end face at the position of the central axis of the optical waveguide, the light beam output from the core at the position of the central axis passes and travels straight through the lens along the central axis of the optical waveguide. At this time, a part of the light beam output from the core at the position of the central axis may become incident on the core at the position of the central axis of the optical waveguide, as back reflection. Thus, back reflection can be further suppressed by providing the cores to the positions except the position of the central axis of the optical waveguide. Even when the core is provided at the position of the central axis of the optical waveguide, back reflection being incident on the core at the position of the central axis of the optical waveguide member can be suppressed if no optical signal is transmitted over the core at the position of the central axis. This core may be called as a dummy core. If a core is provided at the position of the central axis of the optical waveguide in the manner described above, the optical characteristics of the other cores may deteriorate, because the number of other adjacent cores on the first end face is increased. Thus, it may be preferable not to provide any cores at the position of the central axis of the optical waveguide member.

An optical connection structure according to another embodiment of the present application, comprises first and second optical connectors. Each of the first and second connectors comprises a first optical waveguide including a plurality of cores each extending along a first direction, the first optical waveguide having a first end face in the first direction, wherein the cores are arranged on the first end face at positions except a position of a central axis of the first optical waveguide, and a first lens having a second end face and a third end face opposite to the second end face in the first direction, the first lens unit having an optical axis extending along the first direction. The first optical waveguide and the first lens are arranged so that the central axis of the first optical waveguide coincides with the optical axis of the first lens. The second end face is positioned facing the first end face, and the third end face extends along a plane perpendicular to an optical axis of the first optical waveguide. The third end face of the first optical connector may face the third end face of the second optical connector in parallel, with a gap therebetween in the first direction.

In the above optical connection structure, the light beam output from the optical waveguide included in the first optical connector becomes incident on the second end face of the lens provided to the first optical connector, is gradually bent toward the optical axis of the lens inside of the lens, and is then output from the third end face of the lens. The light beam is then become incident on the third end face of the lens provided to the second optical connector, and is gradually bent toward the optical axis of the lens provided to the second optical connector in the lens, and then becomes incident on the optical waveguide of the second optical connector. The third end faces of the first and the second optical connectors extend along planes that are perpendicular to the optical axis of the optical waveguide provided to the first and the second optical connectors, and the first and the second optical connectors face each other in parallel. Thus, the light beam being incident on or the light beam output from the third end faces of the first and the second optical connectors is inclined with respect to the optical axis of the optical waveguides provided to the first and the second optical connectors. In this manner, the back reflection at the interface between the lens and the air in the first and second optical connectors can be suppressed. Furthermore, because the first optical connector and the second optical connector are not connected using the PC connection, the compressive force is not required. Therefore, a plurality of cores of the first optical waveguide can be optically connected to those of the second optical waveguide easily, and the condition for polishing the first end face can be alleviated.

Detail of Embodiments of the Present Application

Examples of an optical connector and an optical connection structure according to embodiments will now be explained with reference to drawings. These examples are, however, not intended to limit the scope of the present invention in any way, and are intended to include any modifications described in the appended claims, and those falling within the meaning and the scope of the claims and the equivalent thereof. In the description of the drawings hereunder, the same reference numerals are given to the same elements, and redundant explanations thereof are omitted.

Figure 1:
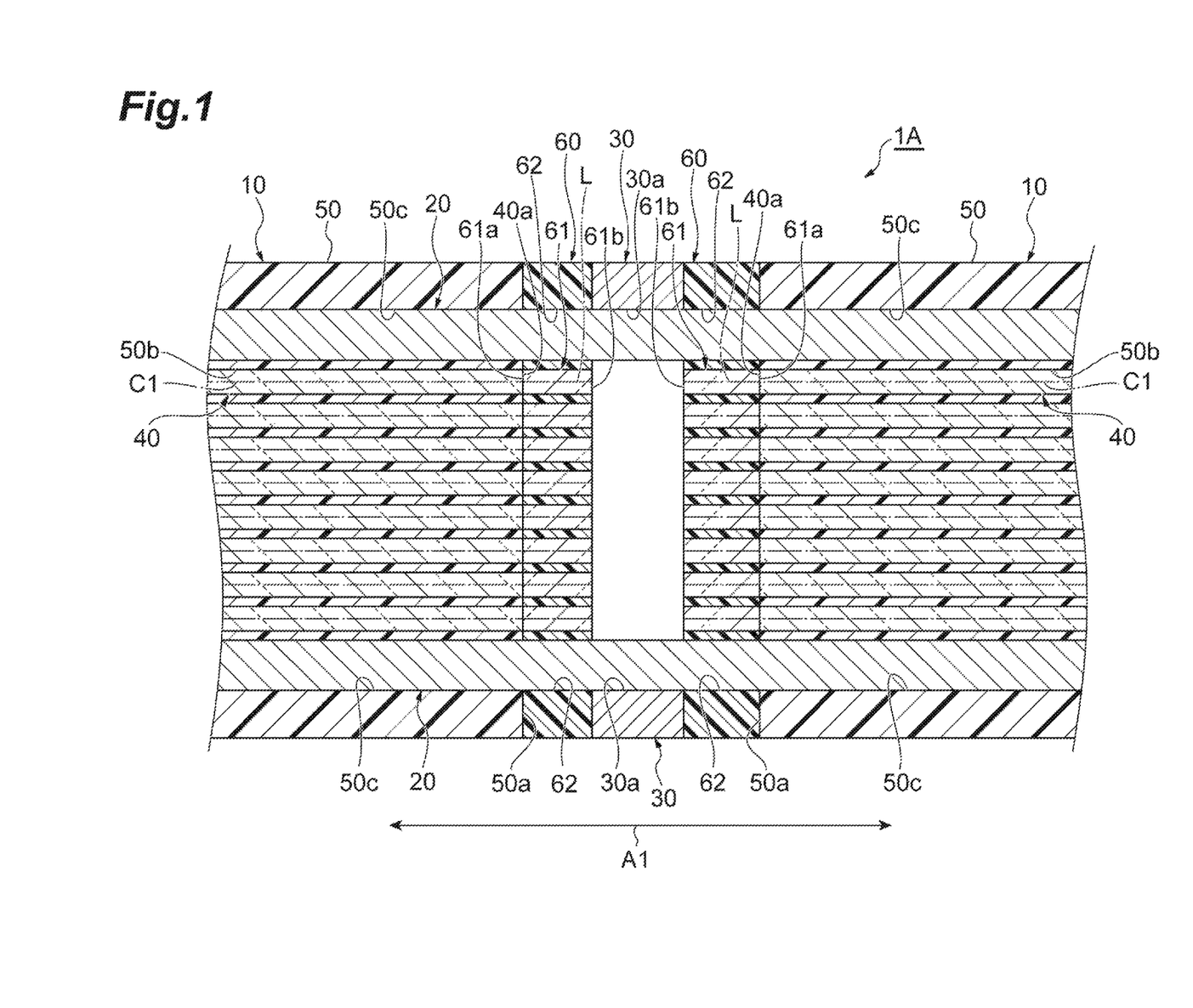
FIG. 1 is a cross-sectional view of a structure of an optical connection structure including a pair of optical connectors according to an embodiment of the present application, providing a cross-sectional view across a direction in which the pair of optical connectors are connected.

FIG. 1 is a cross-sectional view illustrating an optical connection structure 1A including a pair of optical connectors 10 according to the embodiment, providing a cross-sectional view along the direction (a first direction A1) in which the pair of optical connectors 10 are connected. As illustrated in FIG. 1, the optical connection structure 1A includes the pair of optical connectors 10, a pair of guide pins 20, and a spacer 30. One of the optical connectors (a first optical connector) 10 included in the pair of the optical connectors 10 faces the other optical connector (a second optical connector) 10 in parallel, with a gap therebetween. The guide pins 20 are members with a substantially cylindrical shape extending along the first direction A1. The guide pins 20 align the one optical connector 10 and the other optical connector 10 with respect to each other in the radial direction. The spacer 30 has a plate-like shape with an opening 30a. The opening 30a enables a plurality of optical paths extending between the one optical connector 10 and the other optical connector 10 to pass. The gap between the one optical connector 10 and the other optical connector 10 is defined by the abutments of the spacer 30 against the one optical connector 10 and the other optical connector 10. Because the pair of optical connectors 10 both have the same structure, the structure of the one optical connector 10 will mainly be explained below.

Figure 2:
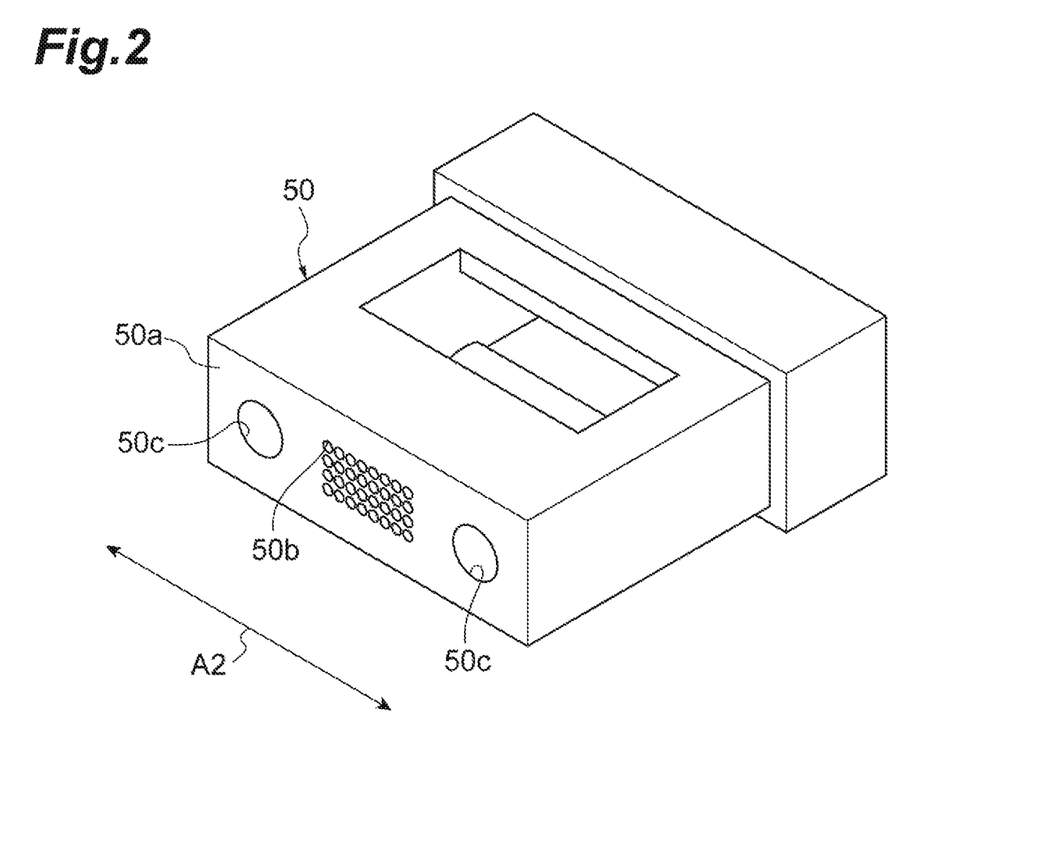
FIG. 2 is a perspective view of a ferrule viewed obliquely from the front side.
Figure 3:
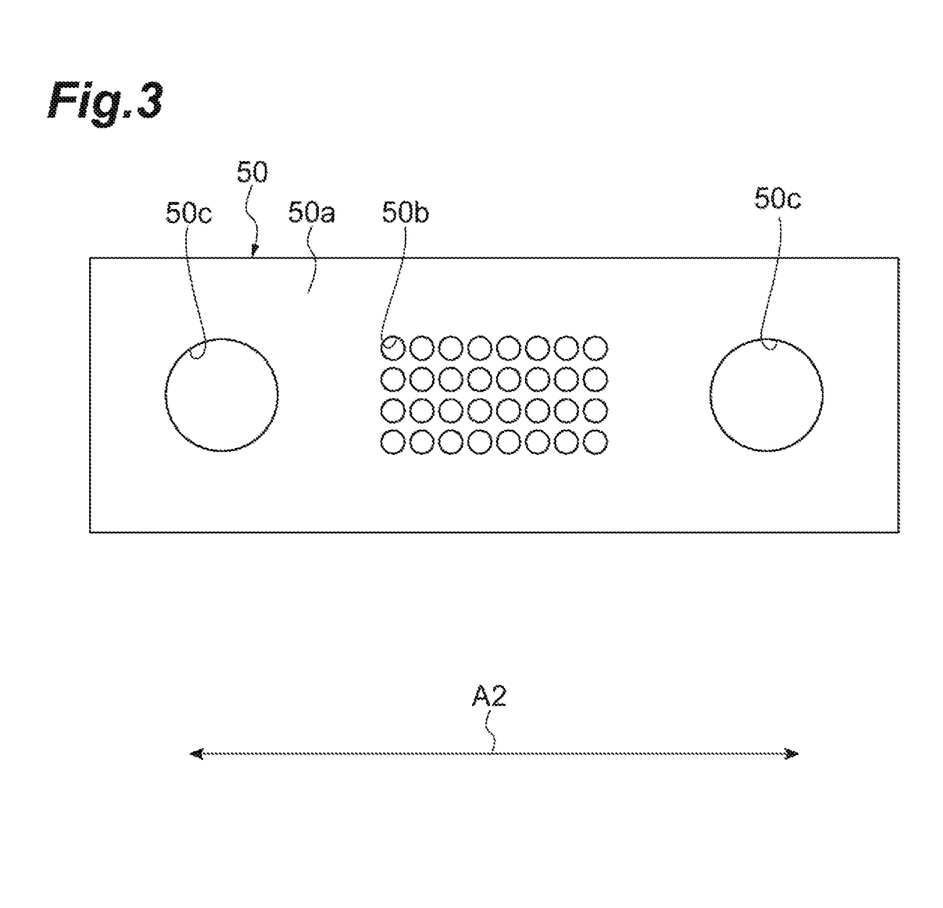
FIG. 3 is a front view of an end face of the ferrule.

The optical connector 10 includes a plurality of multi-core fibers 40, a ferrule 50, and a lens array 60. The multi-core fiber 40 is an optical waveguide and has a first end face 40a in the first direction A1. The ferrule 50 is a MT connector ferrule, and has a flat ferrule end face 50a on one end in the first direction A1. FIG. 2 is a perspective view of the ferrule 50, viewed obliquely from the front side. FIG. 3 is a front view of the ferrule end face 50a of the ferrule 50. As illustrated in FIGS. 2 and 3, the ferrule 50 has a plurality of multi-core fiber insertion holes 50b, and a pair of first guide holes 50c. The multi-core fiber insertion holes 50b have a circular cross-section across a direction perpendicular to the central axis of the insertion hole, and extend along the first direction A1. The multi-core fiber insertion holes 50b can be arranged one-dimensionally or two-dimensionally on a cross-section that is perpendicular to the first direction A1. According to one embodiment, eight multi-core fiber insertion holes 50b arranged along a second direction A2 are further arranged in four rows in a direction perpendicular to the second direction A2. The inner diameter of the multi-core fiber insertion hole 50b is the same as the outer diameter of the multi-core fiber 40. The multi-core fibers 40 are held by allowing the multi-core fibers 40 to be inserted into the respective multi-core fiber insertion holes 50b. The first end faces 40a of the respective multi-core fibers 40 are exposed from the ferrule end face 50a. In one example, the first end faces 40a extend flatly on the same plane as the ferrule end face 50a, and the first end face 40a and the ferrule end face 50a are formed by being polished together. Both of the first guide holes 50c have a circular cross-section across a direction perpendicular to the central axis of the first guide hole 50c, and are provided to both side of the second direction A2, with the multi-core fiber insertion holes 50b positioned therebetween. The inner diameter of the first guide hole 50c is the same as the outer diameter of the corresponding guide pin 20. The ferrule 50 of the one optical connector 10 and the ferrule 50 of the other optical connector 10 are aligned in the radial direction, by inserting each of the guide pins 20 into the corresponding first guide hole 50c.

Figure 4:
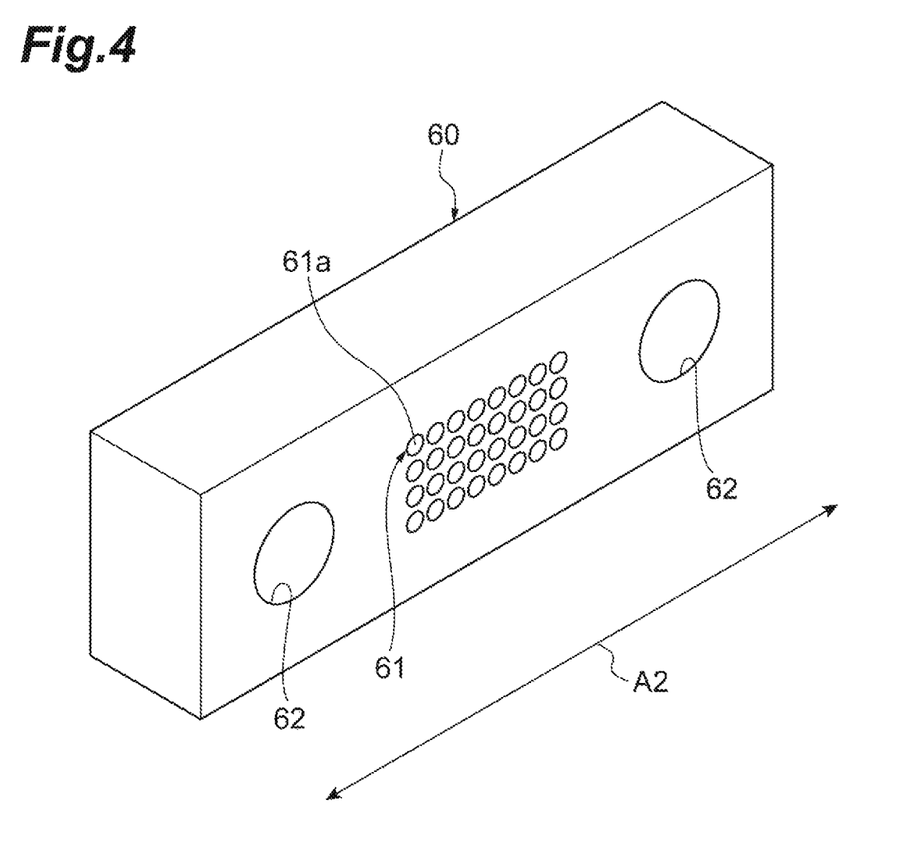
FIG. 4 is a perspective view of a lens array viewed obliquely from the rear side.
Figure 5:
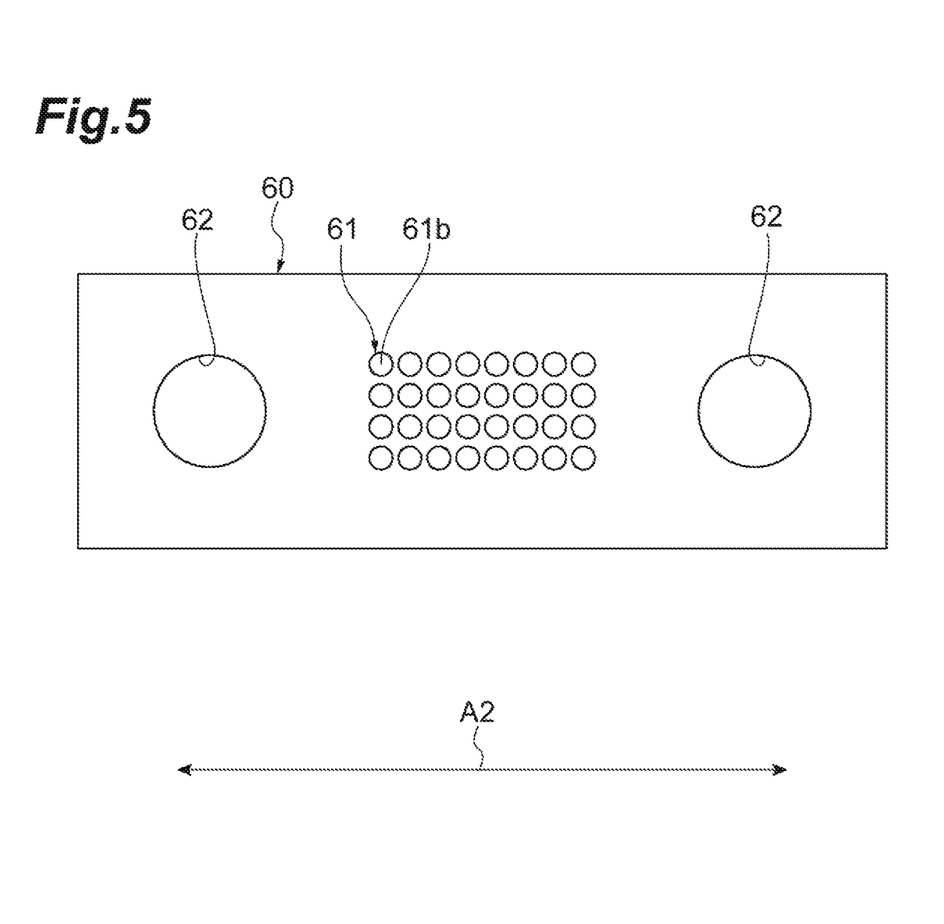
FIG. 5 is a front view of an end face of the lens array.

The lens array 60 has a plurality of lens 61 and a pair of second guide holes 62. FIG. 4 is a perspective view of the lens array 60, viewed obliquely from the rear side. FIG. 5 is a front view of an end face of the lens array 60. The lenses 61 are provided in a manner corresponding to the respective multi-core fibers 40. According to one embodiment, as illustrated in FIGS. 4 and 5, eight lenses 61 arranged in the second direction A2 are further arranged in four rows in a direction perpendicular to the second direction A2, and these lenses 61 are integrally formed. The lens 61 can be a Gradient-index (GRIN) lens. The lens 61 may be made of an optically transparent material, such as transparent resin, or made of glass. The lens 61 has a refractive index distribution that is resultant of the lens effect, across a plane perpendicular to the optical axis L of the lens 61 (for example, a distribution in which the refractive index decreases gradually from the center toward the peripheral), and the optical axis L of the lens 61 extending along the first direction A1 coincides with the central axis C1 of the corresponding multi-core fiber 40. Both of the second guide holes 62 have a circular cross-section across a direction perpendicular to the central axis, and are provided at positions corresponding to the respective first guide holes 50c. The inner diameter of the second guide hole 62 is the same as the inner diameter of the first guide hole 50c. The lens array 60 is aligned in the radial direction by inserting each of the guide pins 20 into the corresponding second guide hole 62.

The lens 61 has a second end face 61a and a third end face 61b opposite to the second end face 61a in the first direction A1. The third end face 61b extends along a plane that is perpendicular to the optical axis of the multi-core fiber 40, and faces the third end face 61b of the other optical connector 10 in parallel, with a gap therebetween. The third end face 61b of the one optical connector 10 and the third end face 61b of the other optical connector 10 abut against the spacer 30. The second end face 61a of the lens 61 is positioned in a manner facing the first end face 40a of the multi-core fiber 40, and adhesive agent or grease for matching the refractive index of the lens 61 and that of the multi-core fiber 40 is applied between the second end face 61a and the first end face 40a. The second end face 61a and the first end face 40a are coupled by the adhesive agent or grease. Alternatively, the second end face 61a and the first end face 40a may be fixed with each other via fusion splicing.

Figure 6:
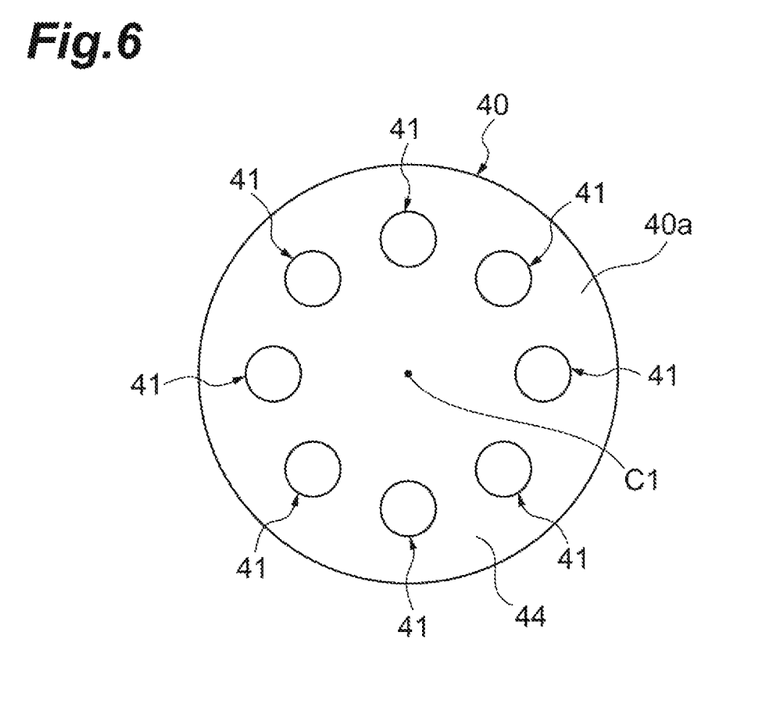
FIG. 6 is a front view of an end face of a multi-core fiber.

FIG. 6 is a front view of the first end face 40a of the multi-core fiber 40. The multi-core fiber 40 includes a plurality of cores 41 extending along the first direction A1, and a cladding 44 that clads the plurality of cores 41 therein. Each core, including the cores 41, included in the multi-core fiber 40 is provided on the first end face 40a at a position except the position of the central axis C1 of the multi-core fiber 40, and the arrangement of the cores 41 has an even-numbered rotational symmetry with respect to the central axis C1 of the multi-core fiber 40. According to one embodiment, as illustrated in FIG. 6, the multi-core fiber 40 has eight cores 41, and the eight cores 41 are arranged at positions that are equally distant from the central axis C1 of the multi-core fiber 40, and equally pitched with respect to each other.

Figure 7:
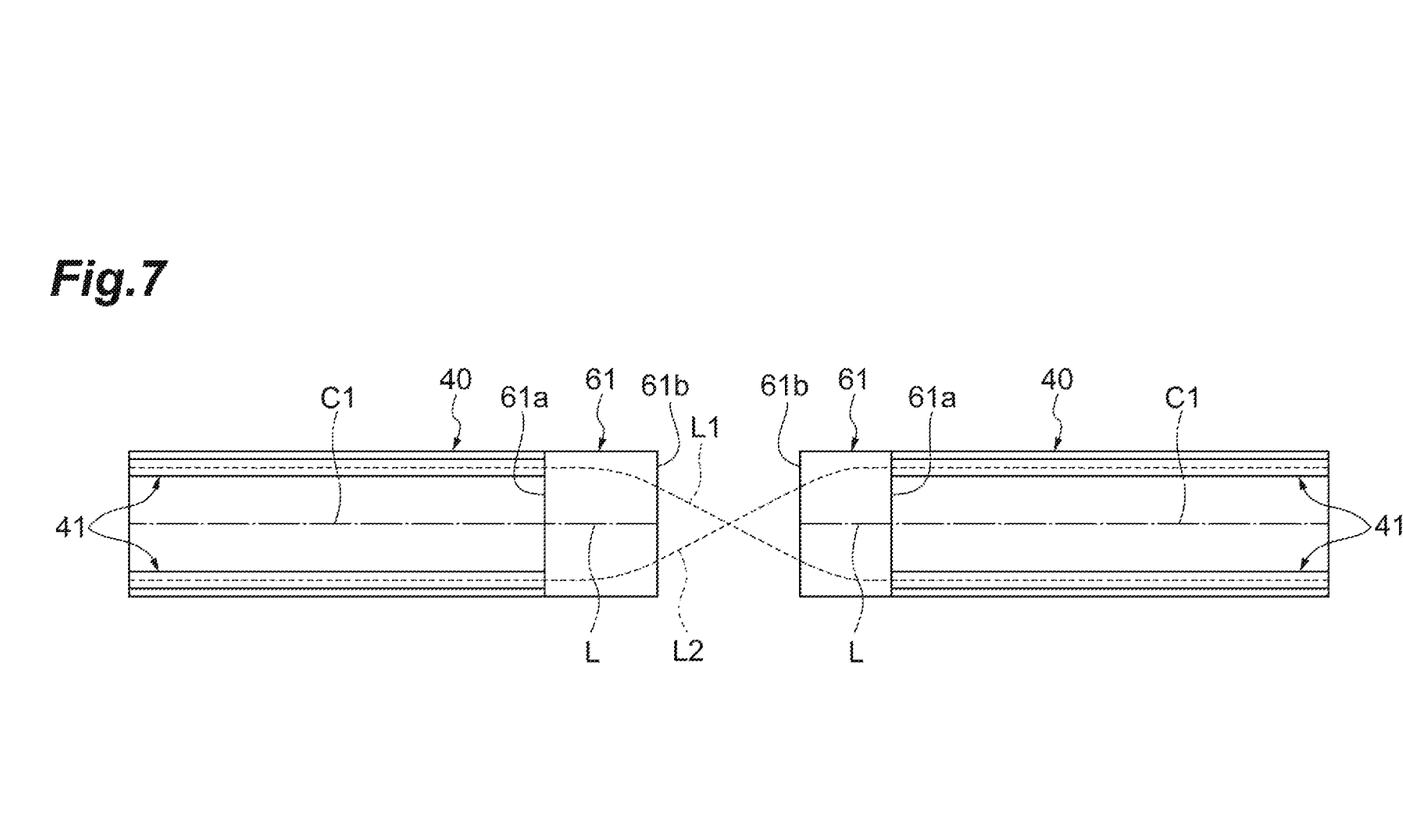
FIG. 7 is a schematic illustrating how a pair of optical connectors of the multi-core fibers are connected in a manner facing each other.

FIG. 7 is a schematic illustrating how a pair of optical connectors 10 of the multi-core fibers 40 is connected in a manner facing each other. As illustrated in FIG. 7, the light beams L1, L2 output from the cores 41 of the multi-core fiber 40 become incident on the second end face 61a, and are collimated inside the lens 61. Since the light beams L1, L2 being incident are away from the optical axis L of the lens 61, the light beams L1, L2 become deflected. In other words, the light beams L1, L2 become gradually bent toward the optical axis L of the lens 61 inside of the lens 61, due to the lens effect of the lens 61. The collimated light beams L1, L2 are then output from the third end face 61b, become incident on the third end face 61b of the lens unit 61 provided to the other optical connector 10, and are condensed inside of the lens 61 of the other optical connector 10. The light beams L1, L2 are then gradually bent toward the optical axis L of the lens 61, inside of the lens 61 of the other optical connector 10. The condensed light beams L1, L2 are then output from the second end face 61a, and become incident on the cores 41 of the multi-core fiber 40 provided to the other optical connector 10. In this manner, the one optical connector 10 and the other optical connector 10 are optically connected to each other.

Advantageous effects achieved by the optical connector 10 according to the embodiment explained above will now be explained. As illustrated in FIG. 7, the light beams L1, L2 output from the third end face 61b are inclined with respect to the optical axis of the multi-core fibers 40, and the third end face 61b extends along a plane that is perpendicular to the optical axis of the multi-core fiber 40. Thus, the light beams L1, L2 are inclined with respect to the direction perpendicular to the third end face 61b, so that back reflection at the interface between the third end face 61b and the air can be suppressed, without polishing the third end face 61b diagonally. Furthermore, since the one optical connector 10 and the other optical connector 10 face each other with a gap therebetween, the cores 41 of the multi-core fiber 40 are not connected using the PC connection. Thus, the compressive force for bringing the cores 41 into the PC connection is not required, and the optical connectors 10 can be optically connected easily each other. Furthermore, since the cores 41 are not brought into the PC connection, it is not necessary to polish the cores 41 by strictly managing the amount by which the cores 41 protrude from the ferrule 50. Thus, the condition for polishing the first end face 40a can be alleviated. Because the condition for polishing the first end face 40a is alleviated, it is no longer necessary to clean the first end face 40a carefully.

The optical connector may also include a plurality of multi-core fibers 40 and a plurality of lenses 61, and the lenses 61 may be provided so as to correspond to the respective multi-core fibers 40, as described in the embodiment. Since the cores 41 are not connected using the PC connection as mentioned above, the optical connection structure 1A does not require the compressive force for bringing the cores 41 into the PC connection. Thus, the optical connector 10 can be optically connected easily, because the compressive force for bringing the first end faces 40a into the PC connection is not required even when the multi-core fiber 40 having a plurality of cores 41 is provided in plurality. According to one embodiment, thirty-two multi-core fibers 40 each of which includes eight cores 41 are used, for example. That is, 256 cores 41 are used in total. In such a configuration in which an extremely large number of cores are used, as that described above, the compressive force required to bring the cores 41 into the PC connection becomes extremely large. However, in this embodiment, since the compressive force for bringing the cores 41 into the PC connection is not required, an extremely large number of cores can be optically connected easily. In other words, a super-multi-core optical connector 10 having an extremely large number of cores can be connected easily.

As described in the embodiment, the lenses 61 may be integrally structured into the lens array 60. In this manner, when the optical connector 10 is assembled, the ferrule 50 holding the multi-core fibers 40 can be assembled with the lenses 61 easily. Thus, according to the embodiment, the optical connector 10 can be manufactured easily.

As described in the embodiment, the arrangement of the cores 41 may have an even-numbered rotational symmetry with respect to the central axis C1 of the multi-core fiber 40. As illustrated in FIG. 7, the light beams L1, L2 output from the cores 41 of the multi-core fiber 40 are bent toward the optical axis L of the lens 61 in the lens 61, and are bent again toward the opposite direction inside of the lens 61 of the other optical connector 10, and reaches the multi-core fiber 40 included in the other optical connector 10. In other words, the light beams L1, L2 output from the cores 41 in the one optical connector 10 become incident on the first end face 40a of the multi-core fiber 40 included in the other optical connector 10 at positions symmetric to the cores 41, with respect to the central axis C1. Thus, as illustrated in FIG. 6, when the arrangement of the cores 41 in the first end face 40a has an even-numbered rotational symmetry with respect to the central axis C1, the same configuration can be used for the arrangement of the cores 41 in the optical connector 10 and that of the cores 41 in the other optical connector 10. Thus, types of the optical connector 10 can be reduced.

As described in the embodiment, each of the cores of the multi-core fiber 40 may be arranged on the first end face 40a at a position except the position of the central axis C1 of the multi-core fiber 40. If a core is provided on the first end face 40a at the position of the central axis C1, the light output from the core at the position of the central axis C1 passes and travels straight through the lens 61 along the central axis C1. At this time, a part of the light output from the core at the position of the central axis C1 may become incident on the core at the position of the central axis C1, as back reflection. Thus, as illustrated in FIG. 6, by providing the cores to the positions except a position of the central axis C1, back reflection can be further suppressed. Even when the core is provided at the position of the central axis C1, the back reflection can be suppressed if no optical signal is transmitted over the core at the position of the central axis C1. However, if a core is provided at the position of the central axis C1 in the manner described above, the optical characteristics of the other cores may deteriorate, because the number of other adjacent cores on the first end face 40a is increased. Thus, it is preferable not to provide any core at the position of the central axis C1. By omitting providing a core that does not transmit any optical signal, wastes in the production can be omitted.

Modification Examples

Figure 8:
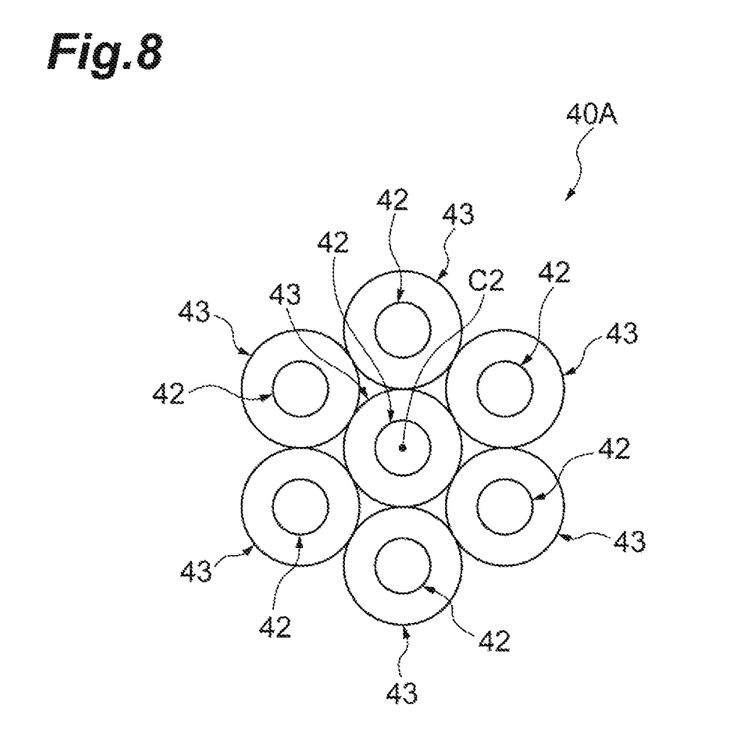
FIG. 8 is a front view of an end face of a fiber bundle according to a modification.

The difference between a modification and the embodiment described above is in that the other optical connector 10 according to the embodiment is provided with a fiber bundle, instead of the multi-core fiber 40. FIG. 8 is a front view of an end face of a fiber bundle 40A according to a modification according to the embodiment. The fiber bundle 40A includes a plurality of single-core fibers 43. Each of the single-core fibers 43 includes one core 42. As illustrated in FIG. 8, according to one embodiment, one (the fiber at the center) of the seven single-core fibers 43 is positioned at the position of the central axis C2 of the fiber bundle 40A, but does not transmit any optical signal, and the other six single-core fibers 43 (the fibers around the periphery) are away from the central axis C2 by an equal distance, and are arranged at positions that are equally pitched with respect to one another. For example, when the cores 42 of the multi-core fiber 40 provided to the one optical connector 10 are arranged at positions corresponding to the cores 42 of the fibers around the periphery in the fiber bundle 40A provided to the other optical connector 10, the light beams output from the cores 42 of the multi-core fiber 40 become incident on the respective cores 42 of the single-core fiber 43. In this manner, fanning-out of the multi-core fiber 40 provided to the one optical connector 10 can be implemented using the fiber bundle 40A of the other optical connector 10.

The optical connector and the optical connection structure according to the present application is not limited to those according to the embodiment described above, and other various modifications are still possible. For example, the embodiment and the modification described above may be combined depending on required objectives and effects to be achieved. Furthermore, in the embodiment described above, a multi-core ferrule is provided to the optical connector, but a single-core ferrule may be provided instead.

What is claimed is:

1. An optical connector comprising:
a first optical waveguide including a plurality of cores each extending along a first direction, the first optical waveguide having a first end face in the first direction, wherein the cores has an arrangement on the first end face an even-numbered rotational symmetry with respect to the central axis of the first optical waveguide at positions except a position of a central axis of the first optical waveguide; and
a first lens having a second end face and a third end face opposite to the second end face in the first direction, the first lens having an optical axis extending along the first direction,
wherein the first optical waveguide and the first lens are arranged so that the central axis of the first optical waveguide coincides with the optical axis of the first lens and the first lens corresponds to the plurality of cores of the first optical waveguide,
wherein the second end face is positioned facing the first end face, and the third end face extends along a plane perpendicular to an optical axis of the first optical waveguide,
wherein the first optical waveguide is a multi-core fiber that includes the plurality of cores and a cladding that dads the plurality of cores, and
wherein the first lens is configured to collimate light beams entering the second end face from the cores and gradually bend the light beams toward the optical axis of the first lens.

2. The optical connector according to claim 1, further comprising,
a second optical waveguide including a plurality of cores each extending along the first direction, the second optical waveguide having a first end face in the first direction, wherein the cores has an arrangement on the first end face an even-numbered rotational symmetry with respect to the central axis of the second optical waveguide at positions except a position of a central axis of the second optical waveguide; and
a second lens having a second end face and a third end face opposite to the second end face in the first direction, the second lens having an optical axis extending along the first direction,
wherein the second optical waveguide and the second lens are arranged so that the central axis of the second optical waveguide coincides with the optical axis of the second lens and the second lens corresponds to the plurality of cores of the second optical waveguide,
wherein the second end face of the second lens is positioned facing the first end face of the second optical waveguide, and the third end face of the second lens extends along a plane perpendicular to an optical axis of the second optical waveguide, and
wherein the second optical waveguide is a multi-core fiber that includes the plurality of cores and a cladding that clads the plurality of cores.

3. The optical connector according to claim 2,
wherein the first and second lenses are integrated into a lens array.

4. The optical connector according to claim 1, wherein the first lens is configured to output the light beams from the third end face so as to incline the light beams with respect to a direction perpendicular to the third end face.

5. The optical connector according to claim 1,
wherein the first lens has a refractive index distribution in which refractive index decreases gradually from a center toward a peripheral of the first lens.

6. The optical connector according to claim 1,
wherein the first lens is a Grin lens.

7. The optical connector according to claim 1,
wherein all of the cores of the first optical waveguide are arranged on the first end face at positions that are equally distant from.

8. The optical connector according to claim 1,
wherein the first optical waveguide has a dummy core arranged at the position of the central axis of the first optical waveguide.

9. The optical connector according to claim 1, further comprising,
a ferrule that holds the first optical waveguide.

10. The optical connector according to claim 9,
wherein the ferrule has an end face that faces the second end face.

11. The optical connector according to claim 9,
wherein the ferrule comprises at least one insertion hole configured to insert the first optical waveguide therein.

12. The optical connector according to claim 1,
wherein the first optical waveguide is a fiber bundle that includes a plurality of optical fibers each comprising a core and a cladding that clads the core.

13. An optical connection structure comprising:
first and second optical connectors, wherein each of the first and second connectors comprises,
a first optical waveguide including a plurality of cores each extending along a first direction, the first optical waveguide having a first end face in the first direction, wherein the cores has an arrangement on the first end face an even-numbered rotation symmetry with respect to the central axis of the first optical waveguide at positions except a position of a central axis of the first optical waveguide; and
a first lens having a second end face and a third end face opposite to the second end face in the first direction, the first lens having an optical axis extending along the first direction,
wherein the first optical waveguide and the first lens are arranged so that the central axis of the first optical waveguide coincides with the optical axis of the first lens and the first lens corresponds to the plurality of cores of the first optical waveguide,
wherein the second end face is positioned facing the first end face, and the third end face extends along a plane perpendicular to an optical axis of the first optical waveguide,
Wherein each of the first optical waveguides of the first and second connectors is a multi-core fiber that includes the plurality of cores and a cladding that clads the plurality of cores, and
wherein the third end face of the first optical connector faces the third end face of the second optical connector in parallel, with a gap therebetween in the first direction.

14. The optical connection structure according to claim 13, further comprising,
a spacer with an opening, the spacer being arranged between the first and second connectors so as to provide the gap therebetween.

15. The optical connection structure according to claim 13, further comprising,
a pair of guide pins each extending along the first direction, the pair of guide pins aligning the first optical connector and the second optical connector each other.

16. The optical connection structure according to claim 13,
wherein each of the first lenses of the first and second connectors is a Grin lens.

* * * * *